US010706561B2

(12) United States Patent
Cheifetz (10) Patent No.: US 10,706,561 B2
(45) Date of Patent: Jul. 7, 2020

(54) SYSTEMS AND METHODS TO TRACK OBJECTS IN VIDEO

(71) Applicant: 612 Authentic Media, Minneapolis, MN (US)

(72) Inventor: Gabriel Cheifetz, Minneapolis, MN (US)

(73) Assignee: 612 Authentic Media, Minneapolis, MN (US)

(*) Notice: Subject to any disclaimer, the term of this patent is extended or adjusted under 35 U.S.C. 154(b) by 70 days.

(21) Appl. No.: 15/851,237

(22) Filed: Dec. 21, 2017

(65) Prior Publication Data

US 2019/0197700 A1 Jun. 27, 2019

(51) Int. Cl.
*G06K 9/00* (2006.01)
*G06T 7/246* (2017.01)
*G06K 9/46* (2006.01)
*G06K 9/62* (2006.01)

(52) U.S. Cl.
CPC .......... *G06T 7/246* (2017.01); *G06K 9/00711* (2013.01); *G06K 9/00744* (2013.01); *G06K 9/46* (2013.01); *G06K 9/6202* (2013.01); *G06T 2207/10016* (2013.01)

(58) Field of Classification Search
CPC .. G06T 7/20; G06T 7/246; G06T 7/73; G06T 2207/10016; G06K 9/00671; G06K 2209/21; G06K 2009/3291; G06K 9/00744; G06K 9/46; G06K 9/6202
See application file for complete search history.

(56) References Cited

U.S. PATENT DOCUMENTS

| | | | | |
|---|---|---|---|---|
| 5,912,980 A | * | 6/1999 | Hunke | G06K 9/00228 348/169 |
| 5,953,076 A | * | 9/1999 | Astle | G06T 7/246 348/580 |
| 2011/0026810 A1 | * | 2/2011 | Hu | G06K 9/6257 382/155 |
| 2011/0123067 A1 | * | 5/2011 | Podilchuk | G06K 9/3241 382/103 |
| 2011/0243381 A1 | * | 10/2011 | Tsagkatakis | G06K 9/6215 382/103 |
| 2011/0311100 A1 | * | 12/2011 | Fan | G06T 7/248 382/103 |
| 2012/0020518 A1 | * | 1/2012 | Taguchi | G06T 7/292 382/103 |
| 2012/0120269 A1 | * | 5/2012 | Capata | G06K 9/00228 348/222.1 |

(Continued)

*Primary Examiner* — Ian L Lemieux
(74) *Attorney, Agent, or Firm* — Esplin & Associates, PC (57) ABSTRACT

Systems and methods to track objects in video are disclosed. Exemplary implementations may obtain a user entry and/or selection of a depiction of an object visible within a first frame of a video and process the depiction of the object for use as a current reference. For subsequent frames, the systems and methods may determine whether the depiction of the object is visible. If the depiction of the object is no longer visible within a particular frame, image features of subsequent frames are compared with the latest reference of the depiction of the object until the depiction of the object is visible again. If and when the object is visible, an object indicator may be displayed on the relevant frames and/or otherwise presented to a viewer.

18 Claims, 6 Drawing Sheets

(56) References Cited

U.S. PATENT DOCUMENTS

| | | | | |
|---|---|---|---|---|
| 2013/0051624 A1* | 2/2013 | Iwasaki | ............. | G06K 9/00791 |
| | | | | 382/103 |
| 2013/0176430 A1* | 7/2013 | Zhu | ........................ | G06T 7/254 |
| | | | | 348/143 |
| 2014/0267397 A1* | 9/2014 | Wagner | ..................... | G06T 7/74 |
| | | | | 345/633 |
| 2015/0063632 A1* | 3/2015 | Deng | ....................... | G06T 7/254 |
| | | | | 382/103 |
| 2016/0063344 A1* | 3/2016 | Fan | ...................... | G06K 9/4604 |
| | | | | 382/103 |
| 2016/0358341 A1* | 12/2016 | Li | ............................. | G06T 3/40 |
| 2017/0132472 A1* | 5/2017 | Tao | ................... | G06K 9/00758 |
| 2018/0284777 A1* | 10/2018 | Li | ............................. | G06T 7/20 |
| 2019/0026905 A1* | 1/2019 | Siegemund | ............. | G06T 7/248 |

* cited by examiner

SYSTEMS AND METHODS TO TRACK OBJECTS IN VIDEO

FIELD OF THE DISCLOSURE

The present disclosure relates to systems and methods to track objects in video.

BACKGROUND

Systems may be configured to store, transmit, and/or display video. Some systems may allow users to enter and/or select one or more objects within a frame of a video. Systems may be configured to identify and/or otherwise recognize movement of a particular object between different, adjacent frames in a video.

SUMMARY

One aspect of the present disclosure relates to a system configured to track objects in video. As used herein, the term "video" may be used interchangeably with video sequence. The system may include one or more hardware processors configured by machine-readable instructions. The processor(s) may be configured to obtain view information for a video including multiple consecutive frames. For example, in some implementations, the multiple frames may include a first frame, a second frame, a third frame, a fourth frame, and so forth. The view information may define visual content. The visual content may include depictions of objects and/or surfaces. The view information may define the visual content in the form of images, an individual image forming an individual frame of the video. The processor(s) may be configured to obtain user input (e.g., entry and/or selection effectuated by a user) of a depiction of an object visible within a first frame. The processor(s) may be configured to identify a pattern of motion of the depiction of the object between a first frame and a second frame to track a location of the depiction of the object from the first frame to the second frame. As used herein, the term "pattern of motion" may be used interchangeably with movement. The second frame may be adjacent and/or subsequent to the first frame. The processor(s) may be configured to, in response to the depiction of the object within the second frame being viable as a reference, process the depiction of the object for use as a current reference. The processor(s) may be configured to determine whether the depiction of the object is no longer visible within a third frame. The processor(s) may be configured to extract image features for a fourth frame in response to determining the depiction of the object is no longer visible within the third frame. The processor(s) may be configured to compare the image features of the fourth frame with the current reference of the depiction of the object. The processor(s) may be configured to determine, based on the comparison, whether the depiction of the object is visibly present in the fourth frame, such that responsive to comparing image features of the fourth frame with the current reference of the depiction of the object, and determining that the image features of the fourth frame match the current reference (or another reference) of the depiction of the object, determine that the depiction of the object is visibly present within the fourth frame.

Another aspect of the present disclosure relates to a method to track objects in video. As used herein, any association (or relation, or reflection, or indication, or correspondency) involving frames, objects, depictions, locations, image features, (object) references, (object) indicators, parameters, thresholds, functions, notifications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
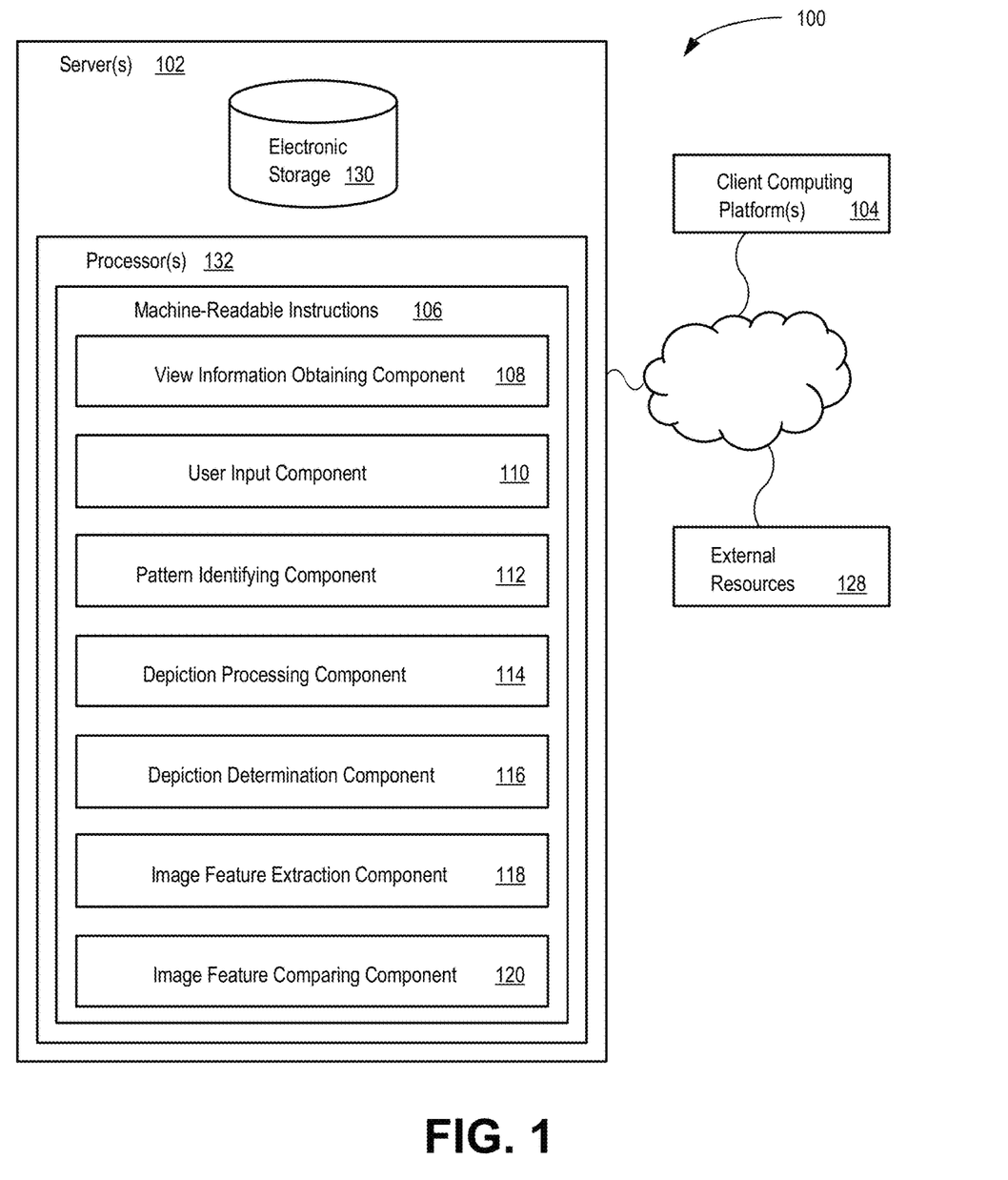
FIG. 1 illustrates a system configured to track objects in a video, in accordance with one or more implementations.

FIG. 1 illustrates a system 100 configured to track objects in video, in accordance with one or more implementations. In some implementations, system 100 may include one or more servers 102, external resources 128, and/or other components. System 100 may be configured to track one or more objects across multiple frames of a video sequence, even if the object is not visible and/or missing on at least some of the frames. Temporary invisibility may be due to camera movement, movement of the object, occlusion and/or blocking of the object, and/or combinations thereof. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. For example, computing platform(s) 104 may communicate with server(2) 102 over a network.

Server(s) 102 may be configured by machine-readable instructions 106. Machine-readable instructions 106 may include one or more instruction components. The instruction components may include computer program components. The instruction components may include one or more of a view information obtaining component 108, a user input component 110, a pattern identifying component 112, a depiction processing component 114, a depiction determination component 116, an image feature extraction component 118, an image feature comparing component 120, and/or other instruction components.

Figure 3:
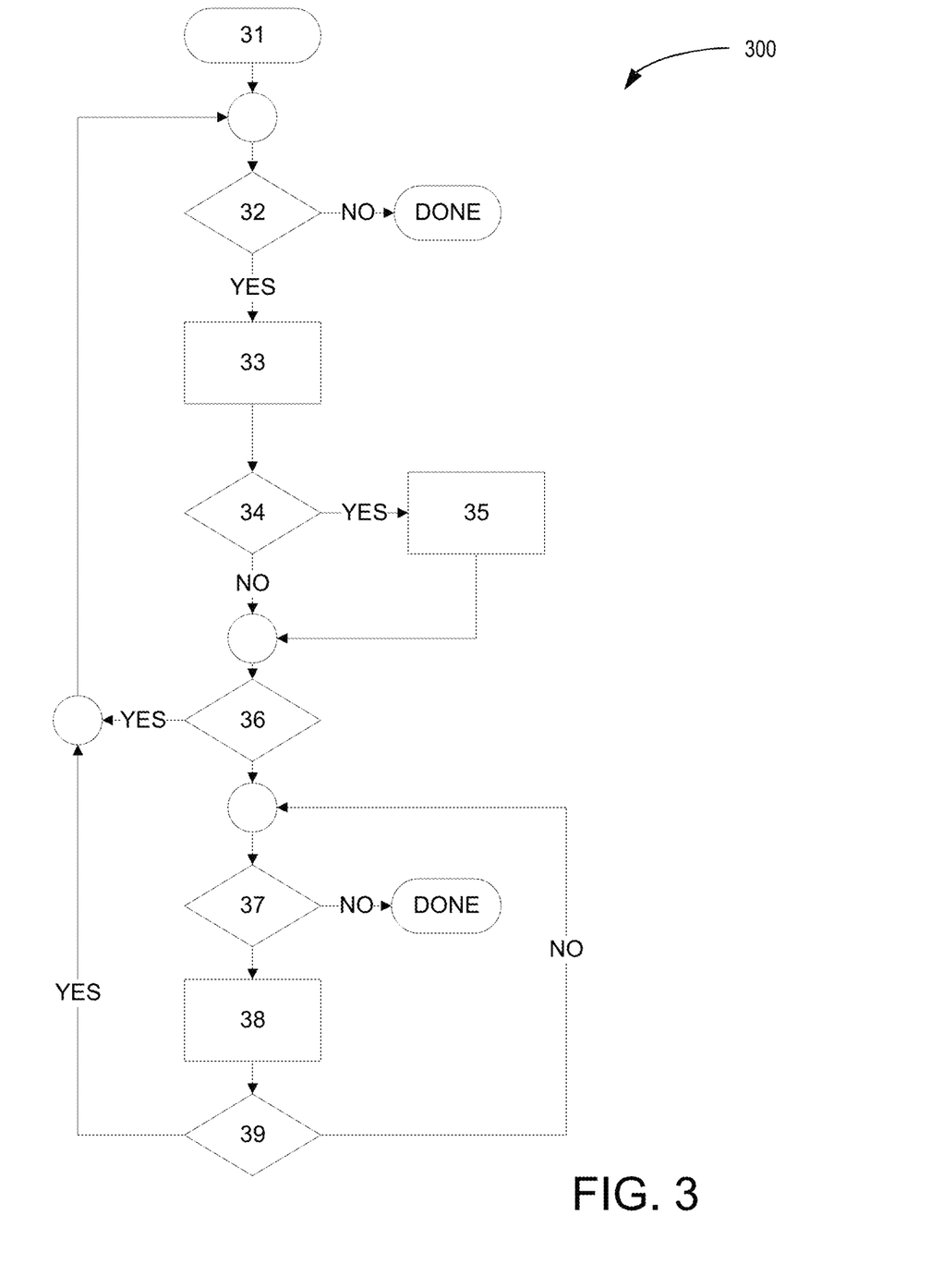
FIG. 3 illustrates an exemplary flow chart depicting high-level operation of a system configured to track objects in a video, in accordance with one or more implementations.

FIG. 3 illustrates an exemplary flow chart 300 depicting high-level operation of system 100, starting at element 31, and ending at one of the elements labeled "done." At element 31, a first frame of a video is obtained, and user input including a selection of a depiction of an object in the first frame is obtained. Selection may be facilitated by one or more input mechanisms. By way of non-limiting illustration, the input mechanisms may include one or more of touch-based input, selection via a cursor, and/or other input. Element 32, like element 37, verifies whether additional frames are available. If not, flow chart 300 ends. Else, for element 32, flow chart 300 continues at element 33, where the next frame of the video is obtained and inspected to determine whether it includes all or part of the depiction of the object. In some implementations, such a determination may be based on a technique called optical flow and/or other motion tracking techniques. Element 34 verifies whether the object is included in its entirety in the current frame. If the object is included in its entirety, element 35 generates or updates an object reference based on the current frame. If the object is not included in its entirety, flow chart 300 continues at element 36. Element 36 verifies whether part of the object is included in the current frame. If part of the object is included, flow chart 300 continues at element 32 where the object continues to be tracked. If part of the depiction of the object is not shown, flow chart 300 continues at element 37, which verifies whether additional frames are available. If additional frames are available, at element 38, the next frame of the video is obtained and inspected to determine, at element 39, whether all or part of the object is detected, based on comparisons with the object reference for the depiction of the object (in particular, the most recent object reference as updated in element 35). In some implementations, such a detection may be based on a technique called feature extraction and/or other techniques. Examples of feature extraction may include one or more of SURF, ORB, AKAZE, and/or combinations thereof, and/or other technologies that support feature extraction. If the object is not detected, flow chart 300 continues at element 37. If the object is detected, flow chart 300 continues at element 32.

Referring to FIG. 1, view information obtaining component 108 may be configured to obtain view information for a video. The video may include multiple consecutive frames. As used herein, the term "obtain" (and derivatives thereof) may include active and/or passive retrieval, determination, derivation, transfer, upload, download, submission, and/or exchange of information, and/or any combination thereof. The view information may be obtained and/or captured by an image sensor, including but not limited to a camera. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. The view information may be stored video information. The view information may be stored animated video information defining an animation.

Figure 4:
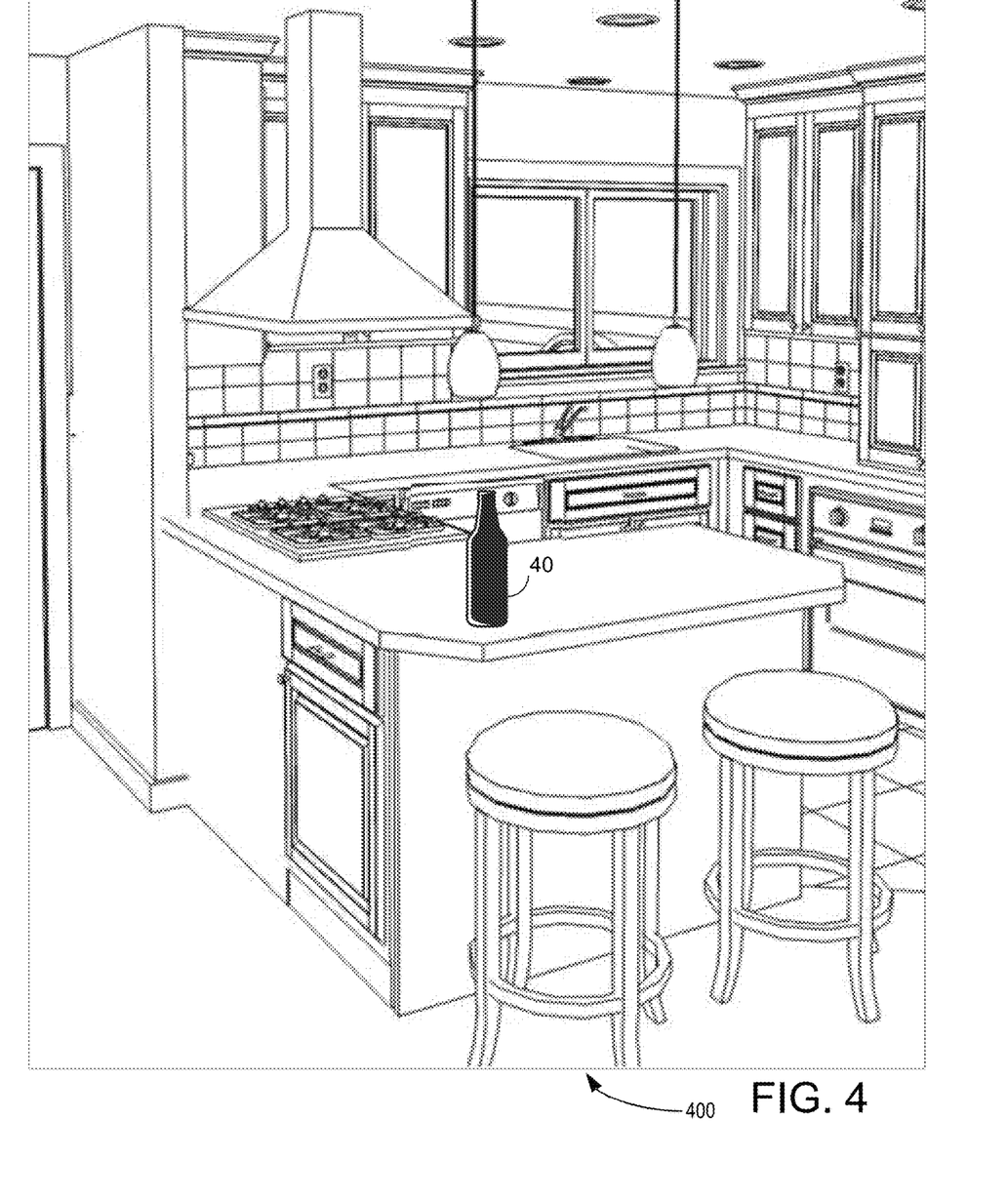
FIG. 4 illustrates exemplary visual content that includes depictions of objects and/or surfaces.

The view information may define visual content. The visual content may include depictions of objects and/or surfaces. The view information may define the visual content in the form of images. An individual image may form an individual frame of the video. An individual image may be defined by a set of pixels. In some implementations, the view information may be a combination of captured information, animated information, and/or other information. In some implementations, functionality provided by view information obtaining component 108 may be applied at element 31 in flow chart 300 in FIG. 3. By way of non-limiting example, FIG. 4 illustrates exemplary visual content 400 that includes depictions of objects and/or surfaces. Visual content 400 may have been captured by an image sensor, and subsequently obtained by a view information obtaining component such as view information obtaining component 108. As depicted in FIG. 4, visual content 400 includes multiple objects and surfaces in a kitchen environment, including a bottle 40.

Referring to FIG. 1, user input component 110 may be configured to obtain user input. In some implementations, the user input may pertain to one or more depictions of one or more objects visible within one or more frames. In some implementations, user input may include entry and/or selection effectuated by a user. For example, a user may effectuate and/or provide user input through a user interface. For example, a user may point at an object and/or draw a shape around an object that is displayed on a touchscreen display. Other ways to enter user input are envisioned within the scope of this disclosure. As used herein, the term "effectuate" (and derivatives thereof) may include active and/or passive causation of any effect. In some implementations, functionality provided by user input component 110 may be applied at element 31 in flow chart 300 in FIG. 3. In some implementations, selection of one or more objects for tracking may be accomplished without receiving manual input from a user. For example, an automated process may select one or more objects based on predetermined preferences. For example, one or more objects may be selected based on their similarity to known objects, e.g., obtained from a stored library of known objects.

Referring to FIG. 1, pattern identifying component 112 may be configured to determine and/or identify movement and/or a pattern of motion of a depiction of an object between different frames in a video. In some implementations, pattern identifying component 112 may be configured to track a location of a depiction of an object from a first frame to a second frame. The depiction of the object entered and/or selected by the user in a particular frame may be a set of pixels associated with the depiction of the object. Identifying the pattern of motion may be based on changes in the location of the depiction of the object between two or more frames, e.g., consecutive frames. Identifying the pattern of motion may be determined based on changes in the location of the depiction of the object between two or more non-consecutive frames. In some implementations, the second frame may be adjacent to the first frame. In some implementations, determinations and/or identifications by pattern identifying component 112 may be based on a technique called optical flow and/or other techniques. In some implementations, functionality provided by pattern identifying component 112 may be applied at element 33 in flow chart 300 in FIG. 3.

Figure 5A:
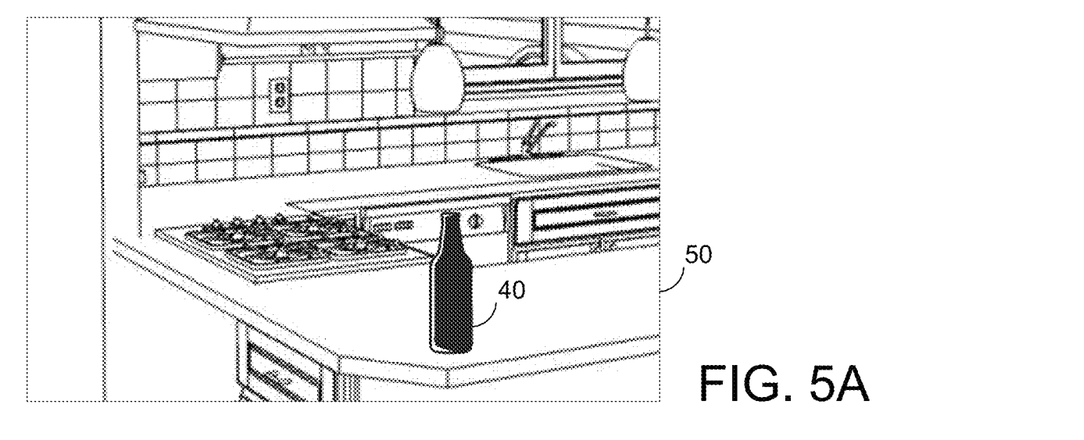
FIG. 5A-5B-5C illustrate exemplary visual content that includes depictions of objects and/or surfaces.
Figure 5B:
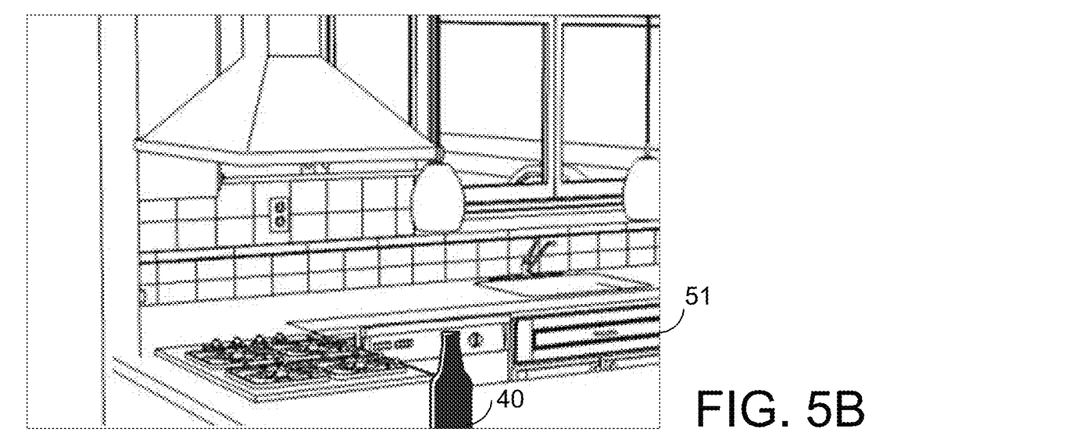

By way of non-limiting example, FIG. 5A illustrates a frame 50 that includes depictions of objects and/or surfaces, including bottle 40. For example, frame 50 may be selected and/or otherwise taken from the visual content depicted in FIG. 4. Frame 50 may be the first frame as described above. FIG. 5B illustrates a frame 51 that includes depictions of objects and/or surfaces, including at least part of bottle 40.

For example, frame 51 may be selected and/or otherwise taken from the visual content depicted in FIG. 4. For example, frame 51 may result by panning up the image sensor after capturing frame 50. Frame 51 may be the second frame as described above. Frame 51 may be subsequent to frame 50.

In some implementations, pattern identifying component 112 may be configured to track the depiction of the object through one or more frames between the second frame and the third frame when the depiction of the object is visible in the one or more frames between the second frame and the third frame but may not viable as a reference. The third frame may be spaced one or more frames after the second frame by virtue of the depiction of the object being visibly present in the one or more frames between the second frame and the third frame.

In some implementations, pattern identifying component 112 may be configured to track the depiction of the object between individual frames of the one or more frames between the second frame and the third frame and updating the pattern of motion of the depiction of the object between the individual frames of the one or more frames.

In some implementations, depiction processing component 114 may be configured to update the current reference when the depiction of the object becomes viable as a reference in individual ones of the frame in the one or more frames between the second frame and the third frame.

In some implementations, the set of pixels associated with the depiction of the object may define a polygon and/or another shape. The sides of the polygon and/or the periphery of the shape defined by the set of pixels associated with the depiction of the object may form an object indicator. In some implementations, an object indicator may be based on the sides of the polygon and/or the periphery of the shape defined by the set of pixels associated with the depiction of the object.

The object indicator may be displayed on frames to visually represent the depiction of the object. The object indicator may track the location of the depiction of the object in the frames in which the depiction of the object is visible. The object indicator may be not displayed when the depiction of the object is not visible within an individual frame. In some implementations, pattern identifying component 112 may be configured to form object indicators, display object indicators on individual frames, and/or track object indicators between multiple frames.

Referring to FIG. 1, depiction processing component 114 may be configured to, in response to the depiction of the object within the second frame being viable as an object reference (or "reference" for short), process the depiction of the object for use as a current reference. Processing the depiction of the object for use as the current reference may include extracting image features for the depiction of the object. In some implementations, an object being viable as a reference may mean the entire depiction of the object is visible. In some implementations, an object being viable as a reference may mean at least a portion of the depiction of the object is visible. For example, the portion may be a predetermined percentage of the original and/or oldest reference, such as 10%, 20%, 30%, 40%, 50%, 60%, 70%, 80%, 90%, and/or another percentage. In some implementations, the portion may be determined based on whether a particular type of feature extraction technology is able to recognize the portion as being part of the reference object. In some implementations, depiction processing component 114 may be configured to effectuate storage of the current reference and one or more prior current references as a set of stored current references. The set of pixels associated with the depiction of the object may include pixels surrounding the depiction of the object. The set of pixels associated with the depiction of the object may include pixels defining a portion of the depiction of the object. The set of pixels may be stored for a reference. In some implementations, functionality provided by depiction processing component 114 may be applied at element 35 in flow chart 300 in FIG. 3.

Depiction processing component 114 may be configured to, in response to the depiction of the object within an individual frame of the one or more frames between the second frame and the third frame being viable as a reference, process the depiction of the object within the individual frame to update the current reference.

Referring to FIG. 1, depiction determination component 116 may be configured to determine whether the depiction of the object is no longer visible within a particular frame, e.g., the third frame. The third frame may be adjacent to the second frame as described above and/or may be spaced from the second frame by one or more frames. Depiction determination component 116 may be configured to determine, e.g., based on a comparison by image feature comparing component 120, whether the depiction of the object is visibly present in a particular frame, e.g., a fourth frame. The fourth frame may be spaced one or more frames after the third frame by virtue of the depiction of the object not being visibly present within the one or more frames between the third frame and the fourth frame.

Figure 5C:
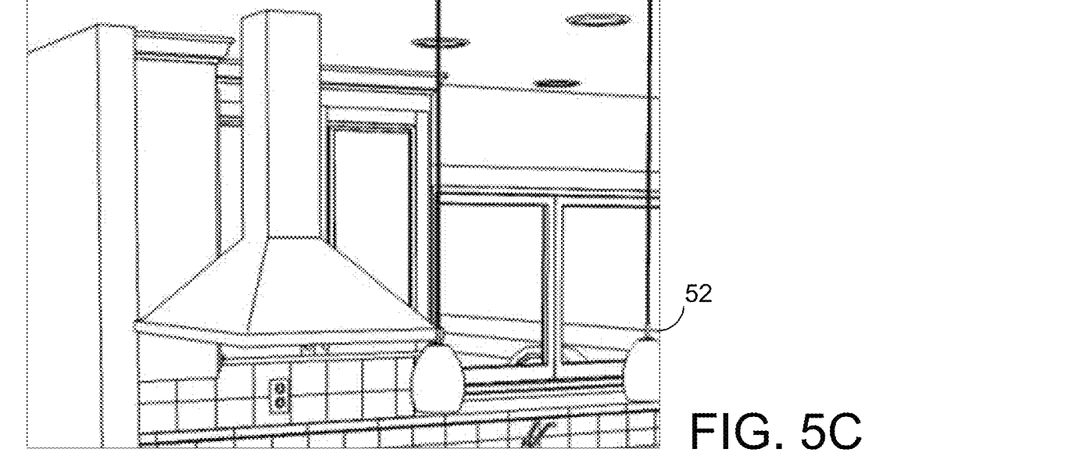

By way of non-limiting example, FIG. 5C illustrates a frame 52 that includes depictions of objects and/or surfaces. For example, frame 52 may be selected and/or otherwise taken from the visual content depicted in FIG. 4. For example, frame 52 may result by panning up the image sensor after capturing frame 51. Frame 52 may be the third frame as described above. Frame 52 may be subsequent to frame 51.

Referring to FIG. 1, responsive to comparing image features of a frame, e.g., a fourth frame, with a current reference of the depiction of the object, and further responsive to a determination that one or more image features of the fourth frame match a current reference of the depiction of the object, depiction determination component 116 may be configured to determine that the depiction of the object is visibly present within a particular frame, e.g., the fourth frame. In some implementations, such a determination may be based on a type of feature extraction. In some implementations, functionality provided by depiction determination component 116 may be applied at one or both of element 36 and element 39 in flow chart 300 in FIG. 3.

By way of non-limiting example, FIG. 5B illustrates a frame 51 that includes depictions of objects and/or surfaces, including at least part of bottle 40. For example, frame 51 may be selected and/or otherwise taken from the visual content depicted in FIG. 4. For example, frame 51 may result by panning down the image sensor after capturing frame 52. Frame 51 may be the fourth frame as described above. Frame 51 may be subsequent to frame 52. In other words, the first, second, third, and fourth frame may be depicted by FIG. 5A, panning up to FIG. 5B, panning up further to FIG. 5C, and panning back down again to FIG. 5B. As depicted, bottle 40 may be fully visible in FIG. 5A, partially visible in FIG. 5B, and not visible in FIG. 5C.

Referring to FIG. 1, image feature extraction component 118 may be configured to extract image features for a fourth frame in response to determining the depiction of the object is no longer visible within one or more prior frames, such as the third frame. The fourth frame may be adjacent to the third frame and/or may be spaced from the third frame by one or more frames. Image feature extraction component 118 may be configured to extract image features for the one or more consecutive frames following the third frame until the depiction of the object may be determined as visibly present in a given frame. In some implementations, such a determination may be based on a type of feature extraction. In some implementations, functionality provided by image feature extraction component 118 may be applied at element 38 in flow chart 300 in FIG. 3.

Referring to FIG. 1, image feature comparing component 120 may be configured to compare the image features of a particular frame, e.g., the fourth frame, with a current reference of the depiction of the object. The image features may be provided by image feature extraction component 118.

Figure 6:
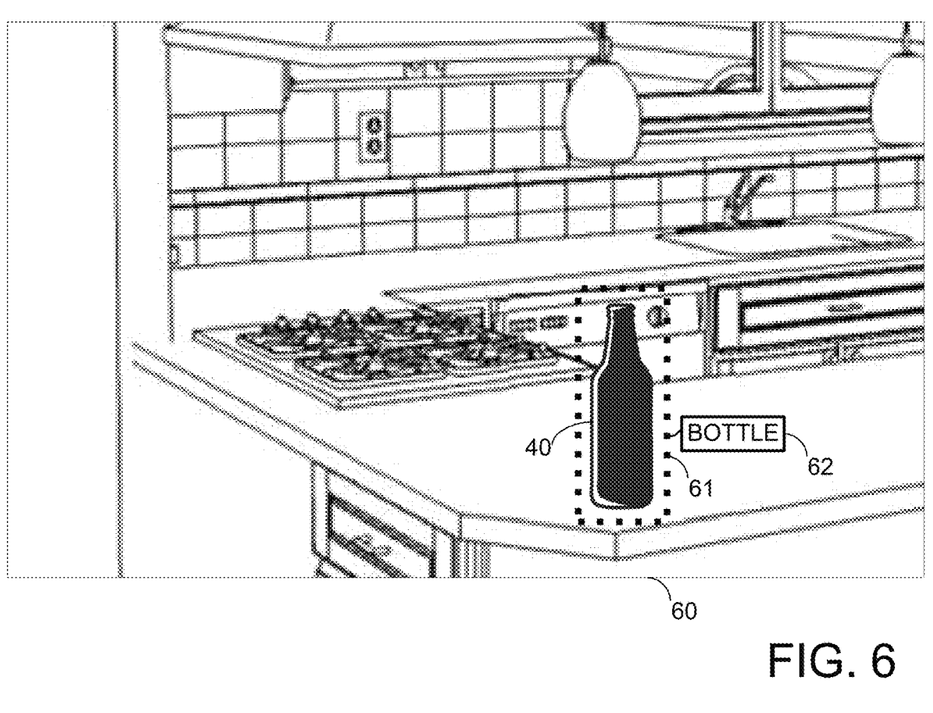
FIG. 6 illustrates visual content including an object indicator, in accordance with one or more implementations.

By way of non-limiting example, FIG. 6 illustrates a frame 60 including bottle 40, an object indicator 61 (depicted as a dotted line around bottle 40), and a label 62 (depicting the text "bottle"). For frames subsequent to frame 60, system 100 may be configured to display object indicators and/or labels around bottle 40 as long as either the particular frame includes all of the bottle, or part of the bottle. In some implementations, system 100 may be configured to display object indicators and/or labels around bottle 40 so long as the displayed part of the bottle is viable as a reference.

Referring to FIG. 1, in some implementations, server(s) 102, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, and/or other components. Processor(s) 132 may be configured to execute components 108, 110, 112, 114, 116, 118, 120, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components. As used herein, the term "processor" is used interchangeably with the term "physical processor."

It should be appreciated that although components 108, 110, 112, 114, 116, 118, and 120 are illustrated in FIG. 1 as being implemented within a single processing unit, in implementations in which processor(s) 132 includes multiple processing units, one or more of components 108, 110, 112, 114, 116, 118, and/or 120 may be implemented remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, and/or 120. As another example, processor(s) 132 may be configured to execute one or more additional components that may perform some or all of the functionality attributed below to one of components 108, 110, 112, 114, 116, 118, and/or 120.

Figure 2:
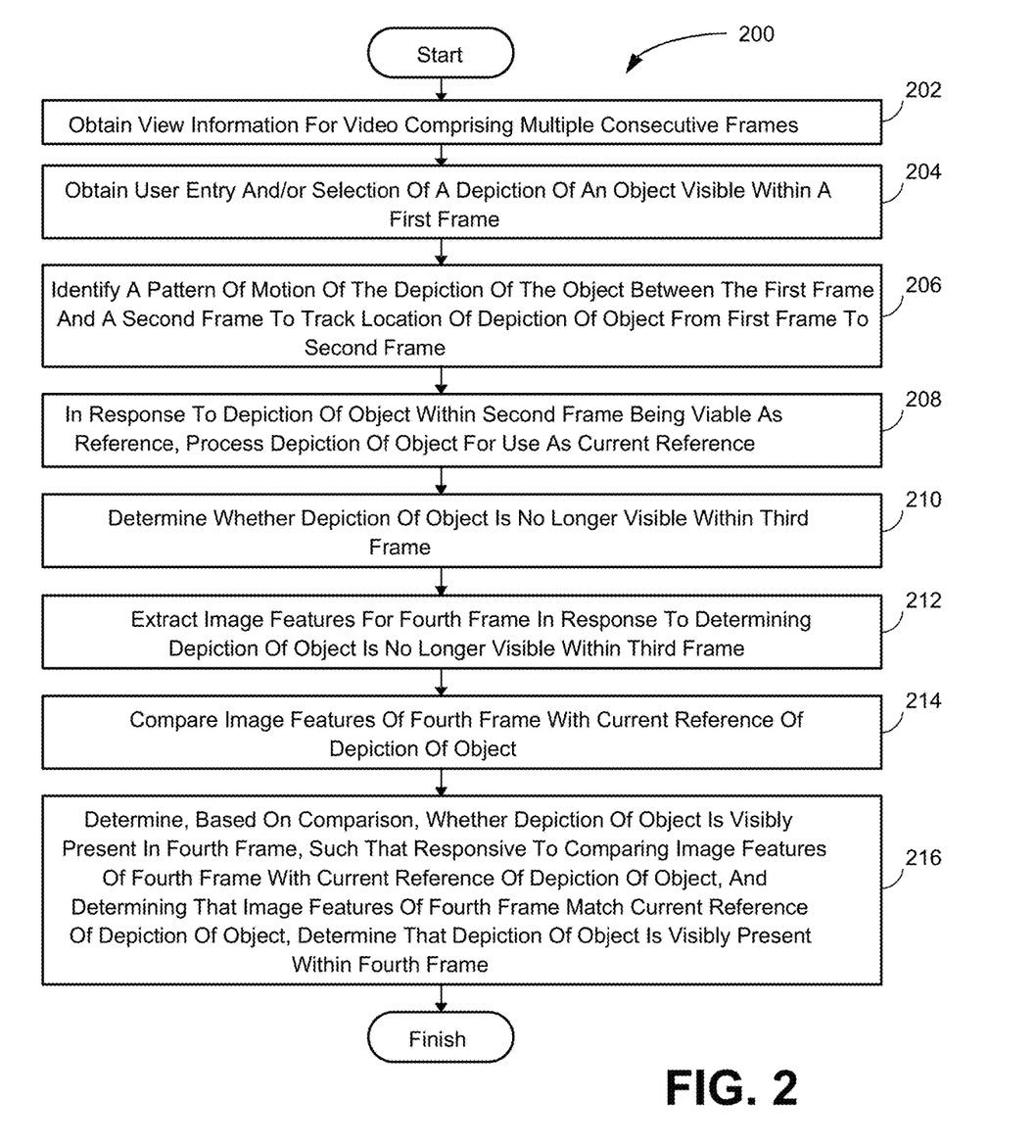
FIG. 2 illustrates a method to track objects in a video, in accordance with one or more implementations.

FIG. 2 illustrates a method 200 to track objects in video, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining view information for a video including multiple consecutive frames. The view information may define visual content. The visual content may include depictions of objects and/or surfaces. The view information may define the visual content in the form of images, an individual image forming an individual frame of the video. Operation 202 may be performed by one or more hardware processors configured by machine-readable instructions including a component that is the same as or similar to view information obtaining component 108, in accordance with one or more implementations.

An operation 204 may include obtaining a user entry and/or selection of a depiction of an object visible within a first frame. Operation 204 may be performed by one or more hardware processors configured by machine-readable instructions including a component that is the same as or similar to user input component 110, in accordance with one or more implementations.

An operation 206 may include identifying a pattern of motion of the depiction of the object between a first frame and a second frame to track a location of the depiction of the object from the first frame to the second frame. The second frame may be adjacent to the first frame. Operation 206 may be performed by one or more hardware processors configured by machine-readable instructions including a component that is the same as or similar to pattern identifying component 112, in accordance with one or more implementations.

An operation 208 may include, in response to the depiction of the object within the second frame being viable as a reference, processing the depiction of the object for use as a current reference. Operation 208 may be performed by one or more hardware processors configured by machine-readable instructions including a component that is the same as or similar to depiction processing component 114, in accordance with one or more implementations.

An operation 210 may include determining whether the depiction of the object is no longer visible within a third frame. Operation 210 may be performed by one or more hardware processors configured by machine-readable instructions including a component that is the same as or similar to depiction determination component 116, in accordance with one or more implementations.

An operation 212 may include extracting image features for a fourth frame in response to determining the depiction of the object is no longer visible within the third frame. Operation 212 may be performed by one or more hardware processors configured by machine-readable instructions including a component that is the same as or similar to image feature extraction component 118, in accordance with one or more implementations.

An operation 214 may include comparing the image features of the fourth frame with the current reference of the depiction of the object. Operation 214 may be performed by one or more hardware processors configured by machine-readable instructions including a component that is the same as or similar to image feature comparing component 120, in accordance with one or more implementations.

An operation 216 may include determining, based on the comparison, whether the depiction of the object is visibly present in the fourth frame, such that responsive to comparing image features of a fourth frame with the current reference of the depiction of the object, and determining that the image features of the fourth frame match the current reference of the depiction of the object, determine that the depiction of the object is visibly present within the fourth frame. Operation 216 may be performed by one or more hardware processors configured by machine-readable instructions including a component that is the same as or similar to depiction determination component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to track objects in video, the system comprising:
one or more hardware processors configured by machine-readable instructions to:
obtain view information for a video comprising multiple consecutive frames, the view information defining visual content, the visual content including depictions of objects and/or surfaces, the view information defining the visual content in the form of images, an individual image forming an individual frame of the video;
obtain a user entry and/or selection of a depiction of an object visible within a first frame;
identify a pattern of motion of the depiction of the object between a first frame and a second frame that appears subsequent to the first frame to track a location of the depiction of the object from the first frame to the second frame, the second frame being adjacent to the first frame;
in response to the depiction of the object within the second frame being viable as a reference, process the depiction of the object for use as a reference;

track the depiction of the object through one or more frames between the second frame and a third frame that appears subsequent to the second frame, wherein such tracking includes:
  in response to the depiction of the object being visibly present in the one or more frames between the second frame and the third frame and not being viable as a reference in the one or more frames between the second frame and the third frame, track the depiction of the object through the one or more frames between the second frame and the third frame is performed using the reference from the second frame, and
  in response to the depiction of the object being viable as a reference in one of the frames in the one or more frames between the second frame and the third frame, process the depiction of the object that is viable as a reference for use as an updated reference;
determine whether the depiction of the object is no longer visible within the third frame using the updated reference;
in response to determining the depiction of the object is no longer visible within the third frame, extract image features from a fourth frame that appears subsequent to the third frame;
perform a comparison of the image features of the fourth frame with the updated reference;
determine, based on the comparison, whether the depiction of the object is visibly present in the fourth frame;
determine whether the depiction of the object within the fourth frame is viable as a reference;
in response to the depiction of the object within the fourth frame being viable as a reference, process the depiction of the object for use as a further updated reference;
in further response to determining the depiction of the object is no longer visible within the third frame using the updated reference,
  extract image features from the third frame; and
  perform a comparison of the image features from the third frame and the further updated reference to further attempt to identify the depiction of the object in the third frame;
track the depiction of the object in one or more frames subsequent to the fourth frame using the further updated reference in response to the depiction of the object being visible in the one or more frames subsequent to the fourth frame but not being viable as a reference; and
in response to the depiction of the object in one of the one or more frames subsequent to the fourth frame being viable as a reference, process such depiction of the object from the one of the one or more frames subsequent to the fourth frame as a still further updated reference.

2. The system of claim 1, wherein an object being viable as a reference means the entire depiction of the object is visible or a portion of the depiction of the object is visible.

3. The system of claim 1, wherein the depiction of the object entered and/or selected by the user in the first frame is a set of pixels associated with the depiction of the object.

4. The system of claim 3, wherein the sides of a polygon defined by the set of pixels associated with the depiction of the object form an object indicator, the object indicator being displayed on frames to visually represent the depiction of the object.

5. The system of claim 1, wherein the multiple consecutive frames are ordered such that during playback the first frame is presented before the second, third, and fourth frames, the second frame is presented before the third and fourth frames, and the third frame is presented before the fourth frame.

6. The system of claim 1, wherein the one or more hardware processors are further configured by machine-readable instructions to:
  track changes in the location of the depiction of the object between individual frames of one or more frames between the second frame and the third frame; and
  update, based on the changes in the location of the depiction of the object between individual frames of the one or more frames between the second frame and the third frame, the pattern of motion of the depiction of the object between the individual frames of the one or more frames.

7. The system of claim 1, wherein the one or more hardware processors are further configured by machine-readable instructions to:
  in response to determining the depiction of the object is no longer visible within the third frame, extract image features for the one or more consecutive frames following the third frame until the depiction of the object is determined as visibly present in one of the consecutive frames following the third frame and prior to the fourth frame.

8. The system of claim 1, wherein the fourth frame is spaced one or more frames after the third frame by virtue of the depiction of the object not being visibly present within the one or more frames between the third frame and the fourth frame.

9. The system of claim 1, wherein at least two of the first, second, third, and fourth frame are adjacent to each other.

10. A computer-implemented method to track objects in video, the method comprising:
  obtaining view information for a video comprising multiple consecutive frames, the view information defining visual content, the visual content including depictions of objects and/or surfaces, the view information defining the visual content in the form of images, an individual image forming an individual frame of the video;
  obtaining a user entry and/or selection of a depiction of an object visible within a first frame;
  identifying a pattern of motion of the depiction of the object between a first frame and a second frame that appears subsequent to the first frame to track a location of the depiction of the object from the first frame to the second frame, the second frame being adjacent to the first frame;
  in response to the depiction of the object within the second frame being viable as a reference, processing the depiction of the object for use as a reference;
  tracking the depiction of the object through one or more frames between the second frame and a third frame that appears subsequent to the second frame, wherein such tracking includes:
    in response to the depiction of the object being visibly present in the one or more frames between the second frame and the third frame and not being viable as a reference in the one or more frames between the second frame and the third frame, tracking the depiction of the object through the one or more frames between the second frame and the third frame is performed using the reference from the second frame, and in response to the depiction of the object being viable as a reference in one of the frames in the one or more frames between the second frame and the third frame, processing the depiction of the object that is viable as a reference for use as an updated reference;

determining whether the depiction of the object is no longer visible within the third frame using the updated reference;

in response to determining the depiction of the object is no longer visible within the third frame, extracting image features from a fourth frame that appears subsequent to the third frame;

performing a comparison of the image features of the fourth frame with the updated reference;

determining, based on the comparison, whether the depiction of the object is visibly present in the fourth frame;

determining whether the depiction of the object within the fourth frame is viable as a reference;

in response to the depiction of the object within the fourth frame being viable as a reference, processing the depiction of the object for use as a further updated reference;

in further response to determining the depiction of the object is no longer visible within the third frame using the updated reference, extracting image features from the third frame; and performing a comparison of the image features from the third frame and the further updated reference to further attempt to identify the depiction of the object in the third frame;

tracking the depiction of the object in one or more frames subsequent to the fourth frame using the further updated reference in response to the depiction of the object being visible in the one or more frames subsequent to the fourth frame but not being viable as a reference; and in response to the depiction of the object in one of the one or more frames subsequent to the fourth frame being viable as a reference, processing such depiction of the object from the one of the one or more frames subsequent to the fourth frame as a still further updated reference.

11. The method of claim 10, wherein an object being viable as a reference means the entire depiction of the object is visible or a portion of the depiction of the object is visible.

12. The method of claim 10, wherein the depiction of the object entered and/or selected by the user in the first frame is a set of pixels associated with the depiction of the object.

13. The method of claim 12, wherein the sides of a polygon defined by the set of pixels associated with the depiction of the object form an object indicator, the object indicator being displayed on frames to visually represent the depiction of the object.

14. The method of claim 10, wherein the multiple consecutive frames are ordered such that during playback the first frame is presented before the second, third, and fourth frames, the second frame is presented before the third and fourth frames, and the third frame is presented before the fourth frame.

15. The method of claim 10, further comprising:
tracking changes in the location of the depiction of the object between individual frames of the one or more frames between the second frame and the third frame; and updating, based on the changes in the location of the depiction of the object between individual frames of the one or more frames between the second frame and the third frame, the pattern of motion of the depiction of the object between the individual frames of the one or more frames.

16. The method of claim 10, further comprising:
in response to determining the depiction of the object is no longer visible within the third frame, extracting image features for the one or more consecutive frames following the third frame until the depiction of the object is determined as visibly present in one of the consecutive frames following the third frame and prior to the fourth frame.

17. The method of claim 10, wherein the fourth frame is spaced one or more frames after the third frame by virtue of the depiction of the object not being visibly present within the one or more frames between the third frame and the fourth frame.

18. The method of claim 10, wherein at least two of the first, second, third, and fourth frame are adjacent to each other.

* * * * *